United States Patent [19]
Smith et al.

[11] Patent Number: 5,754,751
[45] Date of Patent: May 19, 1998

[54] SOFTWARE-BASED PROCEDURE AND APPARATUS FOR ENHANCEMENT OF A GRAY LEVEL IMAGE

[75] Inventors: Marcus A. Smith; Jeffrey L. Trask, both of Boise, Id.

[73] Assignee: Hewlett-Packard Company, Palo Alto, Calif.

[21] Appl. No.: 612,377

[22] Filed: Mar. 7, 1996

[51] Int. Cl.$^6$ .................... G06K 9/56; G06K 9/64; G06F 15/00; B41B 15/00

[52] U.S. Cl. .................... 395/109; 382/205; 382/217; 395/117

[58] Field of Search .................... 382/209, 217, 382/218, 205, 266, 215; 358/456, 458; 395/101, 108, 110, 109, 117

[56] References Cited

U.S. PATENT DOCUMENTS

| | | | |
|---|---|---|---|
| 3,573,789 | 4/1971 | Sharp et al. | 345/132 |
| 4,032,977 | 6/1977 | Liao | 358/426 |
| 4,143,401 | 3/1979 | Coviello | 348/26 |
| 4,150,400 | 4/1979 | Wong | 358/261.3 |
| 4,323,974 | 4/1982 | Sekigawa | 382/272 |
| 4,355,337 | 10/1982 | Sekigawa | 358/447 |
| 4,437,122 | 3/1984 | Walsh et al. | 348/625 |
| 4,450,483 | 5/1984 | Coviello | 348/26 |
| 4,528,561 | 7/1985 | Kitamura | 345/195 |
| 4,847,641 | 7/1989 | Tung | 347/131 |
| 5,005,139 | 4/1991 | Tung | 395/101 |
| 5,237,646 | 8/1993 | Bunce | 395/117 |
| 5,329,599 | 7/1994 | Curry et al. | 382/266 |
| 5,479,584 | 12/1995 | Curry | 395/102 |

Primary Examiner—Yon J. Couso
Assistant Examiner—Ha Tran Nguyen

[57] ABSTRACT

A software/firmware based method for determining gray level values to be assigned to a binary pixel image initially creates a linked list of templates, each template associated with a gray level value to be assigned to an image pixel value. Each template may include a central pixel value and plural neighbor pixel values or just plural neighbor values. However, each template is a listing of entries of template pixel values that are generally arranged in increasing concentric circles about the central pixel value. Each template entry includes a field for a template pixel value, a field for a template pixel address and a link field for a next template entry, in the event of a non-match determination between the associated template pixel value and an image pixel value. The method selects an image pixel window from the binary image and compares a central image pixel in the window with a logically, correspondingly located template pixel value. If a match is found, a next image pixel is compared against a next template entry to determine if a match occurs. This procedure continues, assuming matches are found, until all entries in the template have been tested and found to match, in which case, the central pixel of the image pixel window is changed in accordance with the gray level value associated with the matching template. If, at any time, a non-match occurs, the procedure moves to a linked template entry and the comparison procedure continues in another template. The invention enables a binary search to be executed which identifies a matching template (if any) after considering, on the average, between 5 to 10 entries.

7 Claims, 7 Drawing Sheets

FIG. 4

|   | A | B | C | D | E | F | G | H | I |
|---|---|---|---|---|---|---|---|---|---|
| 0 |   |   |   | 42 | 38 | 46 |   |   |   |
| 1 |   |   |   | 26 | 22 | 30 |   |   |   |
| 2 |   |   | 34 | 14 | 10 | 18 | 33 |   |   |
| 3 | 47 | 31 | 19 | 6 | 2 | 5 | 13 | 25 | 41 |
| 4 | 39 | 23 | 11 | 3 | 0 | 1 | 9 | 21 | 37 |
| 5 | 43 | 27 | 15 | 7 | 4 | 8 | 17 | 29 | 45 |
| 6 |   |   | 35 | 20 | 12 | 16 | 36 |   |   |
| 7 |   |   |   | 32 | 24 | 28 |   |   |   |
| 8 |   |   |   | 48 | 40 | 44 |   |   |   |

FIG. 5

<CODE 1>

| / | ST:WHITE:1.1: |
|---|---|
| 1 | |
| 2 | |
| 3 | de |
| 4 | CDe |
| 5 | Defg |
| 6 | DEFg |
| 7 | F |
| 8 | |
| 9 | |

FIG. 6a

<CODE 0>

| / | WHITE AREA |
|---|---|
| 1 | |
| 2 | |
| 3 | |
| 4 | e |
| 5 | def |
| 6 | e |
| 7 | |
| 8 | |
| 9 | |

FIG. 6b

<CODE 5>

| / | BLACK AREA |
|---|---|
| 1 | |
| 2 | |
| 3 | |
| 4 | E |
| 5 | DEF |
| 6 | E |
| 7 | |
| 8 | |
| 9 | |

FIG. 6c

<CODE 2>

| / | PSF:WHITE:1.3: 3-DOT PROXIMAL SERIF/ |
|---|---|
| 1 | |
| 2 | |
| 3 | |
| 4 | Abcdefg |
| 5 | BCDefGH |
| 6 | abcedfg |
| 7 | |
| 8 | |
| 9 | |

FIG. 6d

```
2198
   0:  1392,   0,    0  ⎫
   1:   748,   0,    1  ⎪
   2:   284,   0,    2  ⎪
   3:    60,   0,    3  ⎬ TEMPLATE 1
   4:     6,   0,    4  ⎪
   5:    -1,   0,    1  ⎭
   6:   626,  15,    4
   7:   626,   0,    5
   8:   626,   0,    6
   9:   626,   0,    7
  10:   626,   0,    8
  11:    36,   0,   10
  12:   626,  15,   12
  13:   626,   0,   16
  14:   626,   0,   20
  15:    28,  15,   24
  16:    28,   0,   28
  17:    28,   0,   32
  18:    22,  15,   40
  19:    22,   0,   44
  20:    22,   0,   48
  21:    -1,   3,   66
  22:    25,   0,   44
  23:    28,  15,   48
  24:    -1,   3,  179
  25:    28,  15,   44
  26:    28,   0,   48
  27:    -1,   3,  251
  28:    32,   0,   28
  29:   626,  15,   32
  30:   626,   0,   35
  31:    -1,   3,  178
  32:   626,  15,   28  ⎫
  33:   626,   0,   32  ⎪
  34:   626,   0,   36  ⎬ TEMPLATE n
  35:    -1,   3,  250 ⎭
  36:   626,  15,   10
  37:   626,  15,   12
  38:   626,   0,   14
  39:   626,   0,   16
  40:   626,   0,   18
  41:   626,   0,   20
  42:   626,  15,   22
```

SOFTWARE-BASED PROCEDURE AND APPARATUS FOR ENHANCEMENT OF A GRAY LEVEL IMAGE

FIELD OF THE INVENTION

This invention relates to print image enhancement techniques and, more specifically, to a method and apparatus for creating a gray level representation of a binary value dot matrix image.

BACKGROUND OF THE INVENTION

A gray level image comprises a multiplicity of pixels, each pixel represented by a digital value indicative of a gray level or a color value. Each gray level corresponds to a color tone between 0 % and 100 %. When such a gray level image is passed to a binary laser printer, the gray level values are converted to binary pixel values through use of dither procedures or other approximation methods in an attempt to faithfully reproduce the gray level image.

The prior art binary laser printer has been succeeded by gray level laser printers which modulate a laser beam intensity or duration to achieve a variation in charge state at each pixel location on a photoconductor which, when subsequently toned, produces a highly faithful gray level reproduction.

Edge definition is a problem in binary pixel images due to the stepped pixel arrangement employed to represent boundaries of characters and images. The prior art has employed a procedure, generally called "Resolution Enhancement technology," (REt) to smooth edges by modulating pixels in accordance with comparisons made to pre-stored template arrangements. U.S. Pat. Nos. 5,005,139 and 4,847,641, both to C. C. Tung and assigned to the same Assignee as this application, describe a hardware-based method for accomplishing such REt edge enhancement. The disclosure of the Tung patents is incorporated herein by reference. Briefly stated, the Tung procedure logically tiles "windows" over successive bit patterns of an image, each image pixel window comprising a center pixel and surrounding neighbor pixels. Each image pixel window is thus a pattern of pixels from the original binary image.

Each image pixel window is compared, in parallel, against hundreds of templates, each template defining an expected edge pixel arrangement which can be improved by modification of the central pixel in the image pixel window. Each template is associated with a correction pixel value for the central pixel of an image pixel window.

The central pixel and neighbor pixels within the image pixel window are compared against the templates, in parallel, via a gate array so as to determine in one or very few clock cycles which template, if any, matches the pixel arrangement within the image pixel window. If a template is found to match the image pixel window pattern, the associated correction pixel value is output and is substituted for the central pixel in the image pixel window. Thus, as the image pixel window is stepped across the image, corrections are made to any pixel arrangement therein which matches a template so as to improve edge presentation of the binary image. REt has proved successful in improving print quality of binary pixel value images.

Presently, two types of fonts are widely used in laser printers, i.e., bitmapped and scalable. A scalable font includes characters that are defined as a series of contours (i.e., functions) that, when provided with a desired point size, produce a precise character of the desired shape and point size. Bitmapped fonts differ from a scalable font in that they cannot be changed in point size. While bitmapped font characters are slowly becoming obsolete, many host processors include software (and resident fonts) which are fed to a connected printer in bitmapped form. Thus, even the new gray level laser printers must continue to support both bitmapped and scalable fonts.

Laser printers that utilize gray level pixel values may employ four, six or eight bits to define each pixel's gray value. Those bits are generally fed directly to the print engine and bypass the hardware REt module, which is retained to process bitmapped font characters. Inclusion of a REt module adds expense to the laser printer. To avoid such added expense, software or firmware-implemented edge smoothing has been considered. However, to replicate the hardware-based Ret procedure requires that thousands of values be serially compared to every pixel of a bitmapped image. Clearly, this slows the operation of the printer and is not user-acceptable.

Accordingly, it is an object of this invention to provide a firmware/software based REt procedure which is capable of rapid execution.

It is another object of this invention to provide a software/firmware REt procedure which is adapted for use in gray level laser printers.

SUMMARY OF THE INVENTION

A software/firmware based method for determining gray level values to be assigned to a binary pixel image initially creates a linked list of templates, each template associated with a gray level value to be assigned to a binary image pixel. Each template may include a central pixel value and plural neighbor pixel values or just plural neighbor values. However, each template is a listing of entries of template pixel values that are generally arranged in increasing concentric circles about the central pixel value. Each template entry includes a field for a template pixel value, a field for a template pixel address and a link field for a next template entry, in the event of a non-match determination between the associated template pixel value and an image pixel value. The method selects an image pixel window from the binary image and compares a central image pixel in the window with a logically, correspondingly located template pixel value. If a match is found, a next image pixel is compared against a next template entry to determine if a match occurs. This procedure continues, assuming matches are found, until all entries in the template have been tested and found to match, in which case, the central pixel of the image pixel window is changed in accordance with the gray level value associated with the matching template. If, at any time, a non-match occurs, the procedure moves to a linked template entry and the comparison procedure continues in another template. The invention enables a binary search to be executed which identifies a matching template (if any) after considering, on the average, between 5 to 10 entries.

DESCRIPTION OF THE DRAWINGS

FIG. 4 is a schematic showing of an edge enhancement template.

FIG. 5 is a schematic of an edge enhancement template, showing the sequence in which the template pixels are compared with pixels in an image pixel window.

FIGS. 6a–6d illustrate representative edge enhancement templates.

FIG. 8 is a linked search list of the templates of FIG. 7.

DETAILED DESCRIPTION OF THE INVENTION

Figure 1:
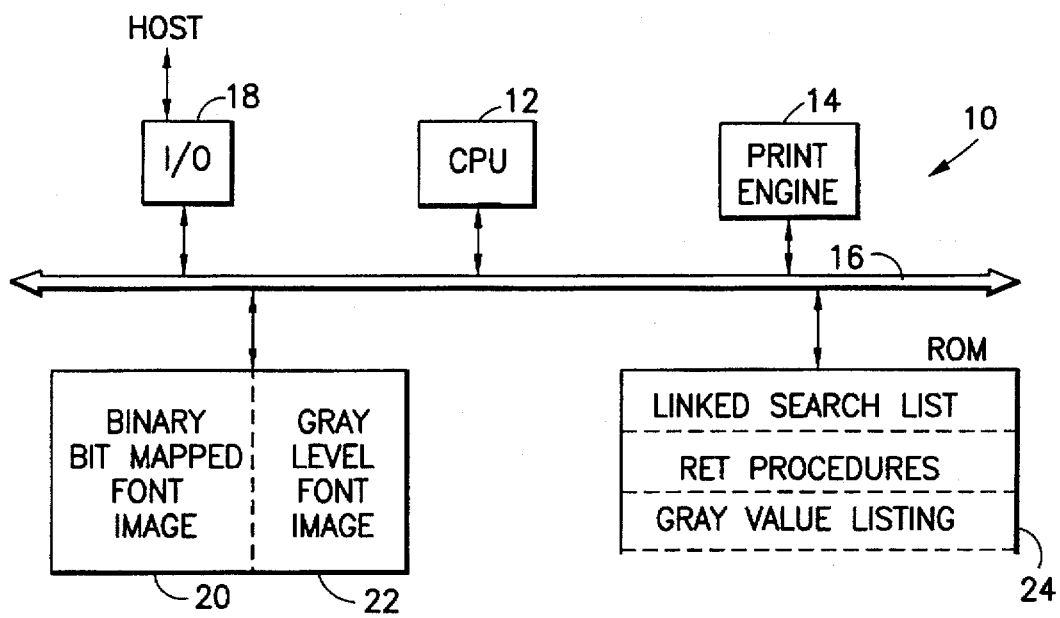
FIG. 1 is a block diagram of a laser printer particularly adapted to implementing the invention.

Referring to FIG. 1, laser printer 10 includes a central processing unit (CPU) 12, a print engine 14 and a bus 16 which connects the various modules within printer 10. Printer 10 receives bitmapped font characters from a host processor via input/output (I/O) module 18. Printer 10 may also receive, or have locally stored, scalable font characters. However, as this invention is particularly directed to the handling of bitmapped characters, further description will not be given of the handling of scalable font characters.

A bitmapped, binary pixel font image is initially buffered in a random access memory (RAM) 20. Hereafter, it will be assumed that the host processor has downloaded a full character font of bitmapped characters which are stored, temporarily, in RAM area 20. A further RAM area 22 is reserved to store gray level image data after resolution enhancement has been accomplished. Hereafter, it is assumed that each pixel of the gray level image comprises a four bit gray value. Those skilled in the art will realize that the gray level representation can be chosen to be any number of bits, depending upon the number of desired gray levels to be reproduced.

A read-only memory (ROM) 24 includes a linked list of REt templates; a REt firmware procedure; and a listing of gray values that are associated with each template in the linked list.

Figure 2:
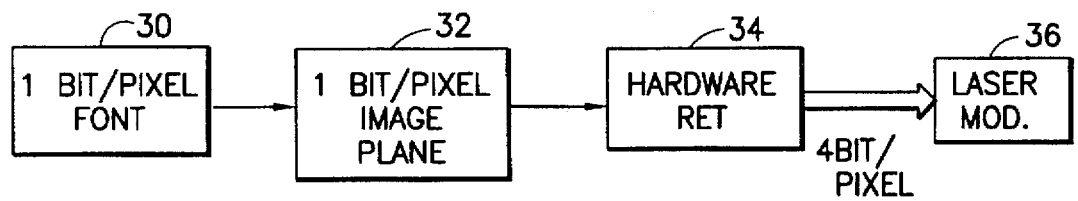
FIG. 2 is a schematic illustrating a prior art resolution enhancement data flow.

FIG. 2 illustrates data flow used by the hardware-based REt technique described in the referenced Tung patents. Initially, a one-bit per pixel character is received from a host processor and is inserted into a one-bit per pixel image plane 32 in accordance with image command data. Thereafter, image plane 32 is passed to a hardware REt module 34 which performs edge smoothing in accordance with a parallel template comparison procedure. If the laser printer is implemented as a gray level printer, REt module 34 outputs, in dependence upon the template comparison action, a corresponding four-bit gray level value to substitute for the input single bit pixel value. The four-bit value is then fed to a laser modulator 36 and the print action occurs. If no match occurs, the image pixel value remains as is (i.e., either all white or all black).

Figure 3:
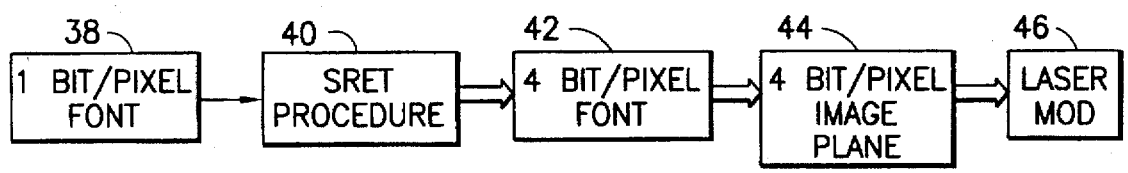
FIG. 3 is a schematic illustrating the data flow that is implemented by the system of FIG. 1.

By comparison, the system of FIG. 1 implements the data flow shown schematically in FIG. 3. As previously indicated, a one-bit per pixel (i.e., bitmapped) character 38 is downloaded from the host processor and is stored in RAM area 20 (FIG. 1). Thereafter, the bitmapped character is subjected to a firmware-controlled REt procedure 40 in accordance with code stored in ROM 24. The output of the REt procedure 40 is a four-bit per pixel, enhanced-edge character which is stored as part of font 42. Thereafter, the edge enhanced character is selected in accordance with required image data and is placed in a four-bit per pixel image plane 44 for application to a laser modulator 46.

Referring now to FIGS. 4 et seq., the detailed operation of the method of the invention will be described. Initially, it is worthwhile to consider the general arrangement of templates used in the method. It is assumed that each template is a 9×9 matrix of values, many of which are "don't cares". Of course, those skilled in the art will realize that other template sizes may also be used and that a 9×9 matrix is selected for explanatory purposes.

As shown in FIG. 4, the template is defined as rows 1–9 and columns A–I. A central pixel 5E (defined by the intersecting coordinates) is the central pixel of the template and is where a comparison action commences. A capital letter resident at a pixel position means that a black dot should be matched and a lower case letter means that a white dot should be matched. No letter means that the pixel position is a "don't care". Thus, pixel position 5E includes an "e" which means that further comparisons will be carried with respect to a corresponding pixel in an image pixel window only if that pixel is a white dot.

A starting template is "tiled" over a corresponding "window" of image pixels and a comparison is made between the logically correspondingly positioned pixel values. It is to be understood that "logical correspondence" refers to a positional correspondence which is present from the viewer's point of view, but which does not, per se, exist during processing. Nevertheless, it is useful in enabling an understanding of the invention. Further, one skilled in the art can derive the necessary timing relationships to enable operation of the invention, given the "logical correspondence" description.

Assuming that the logically corresponding central image pixel to template pixel 5E is a white pixel, the next pixel of the template to be compared to the corresponding window pixel is the one positioned immediately to the right (i.e., 5F).

In FIG. 5, a template is shown which illustrates the sequence of comparisons that occurs subsequent to a central pixel comparison. The sequence of comparisons is in the sequence indicated by the increasing values in the template pixel positions. Note that comparisons 2, 3, 4 and 5 form a smallest possible concentric circle around the central pixel. Thereafter, pixel sites 6, 7, 8 and 9 are compared, and comprise pixels centered on a circle that is next larger in size and concentric with the central pixel. The arrangement of sequential comparisons of template pixel positions with correspondingly positioned image pixels has been chosen because, in many if not most of the templates, the positions of interest are clustered near the center of the template. Further, pixel position near the edges of the template are generally don't cares which are skipped. Thus, the comparison procedure moves in a quasi-spiral fashion, starting with the central pixel and moving out to pixels positioned on succeedingly larger concentric circles about the central pixel.

As will be hereafter understood, the search procedure of the invention enables implementation of a highly efficient binary search action which rapidly determines whether or not a template matches an image pixel window. If the template matches, a value is output which is indicative of a pulse width that is to be output by the printer's laser to provide a proper gray level substitute pixel in place of the central binary image pixel.

In a preferred embodiment, over 300 templates are implemented in the firmware and a comparison result can cause an output of one of six pulsewidths to control the modulation of the printer laser. Table 1 below illustrates the code value N which is output in accordance with a template compare.

TABLE 1

| N  | Pulse-Width (PW)            |
|----|-----------------------------|
| 0  | White dot                   |
| 1  | PW Level 1 (smallest black dot) |
| 2  | PW Level 2                  |
| 3  | PW Level 3                  |
| 4  | PW Level 4                  |
| 5  | PW Level 5 (full black dot) |
| -1 | No match-do not modify PW   |

Referring to FIGS. 6a–6d, each thereof shows a different template which provides a code output indicative of the pulse-width modulation -assuming a match occurs—. Thus, in FIG. 6a, the template shown in FIG. 4 is reproduced and if a match is found of all pixels therein with corresponding pixels in an image pixel window, a code 1 (smallest black dot) is output. FIG. 6b illustrates a template which, if a match occurs with corresponding pixels in an image pixel window, causes a code 0 (white dot) to be output. The template illustrated in FIG. 6c will output a code 5 (full black dot) upon a match being found with corresponding pixels in an image pixel window. FIG. 6d illustrates a template which, if found to match with corresponding pixels in an image pixel window, causes output of a code 2 value.

As aforesaid, each code value output causes the central pixel in an image pixel window to be replaced with a gray level pixel in accordance with the code output. However, hundreds of templates are used (many of which are rotations of each other to accommodate variously oriented font characteristics) to assure appropriate edge enhancement of the binary bitmap font arrangements. To accomplish the template search, which would otherwise require thousands of comparisons:

(i) "don't care" pixel positions are not checked;
(ii) the search procedure is sequenced in accordance with the numbering of the template pixel positions shown in FIG. 5; and
(iii) each succeeding template listing in a string of linked template listings includes only template pixel values for which a match has not yet been found in a previous compare action in another template in the respective string.

There are more white pixels in the templates than there are black pixels—due to the fact that edges are considered and thin lines are sometimes encountered. As a result, white pixels are assigned highest priority and black pixels next. Each template is then represented as a list of black/white pixels, ordered in the spiral manner shown in FIG. 5. Accordingly, the templates are sorted with white pixels given the highest priority. All templates having n sequential white pixels, starting with the central pixel, are listed first, followed by templates having n-1 white pixels, templates having n-2 white pixels, etc.

Figure 7A:
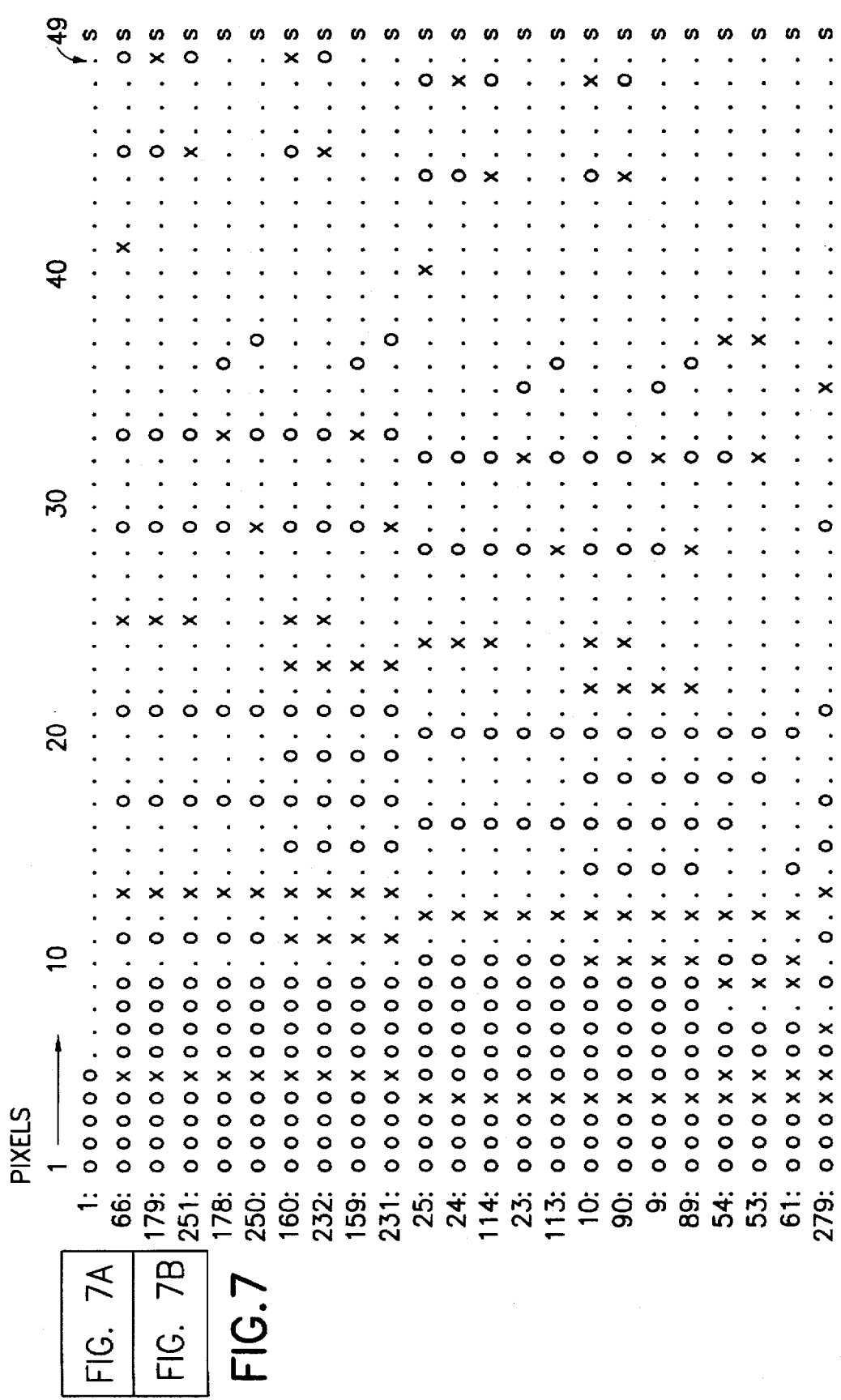
FIG. 7 is a listing of templates, ordered in accord with numbers of white and black dots.
Figure 7B:
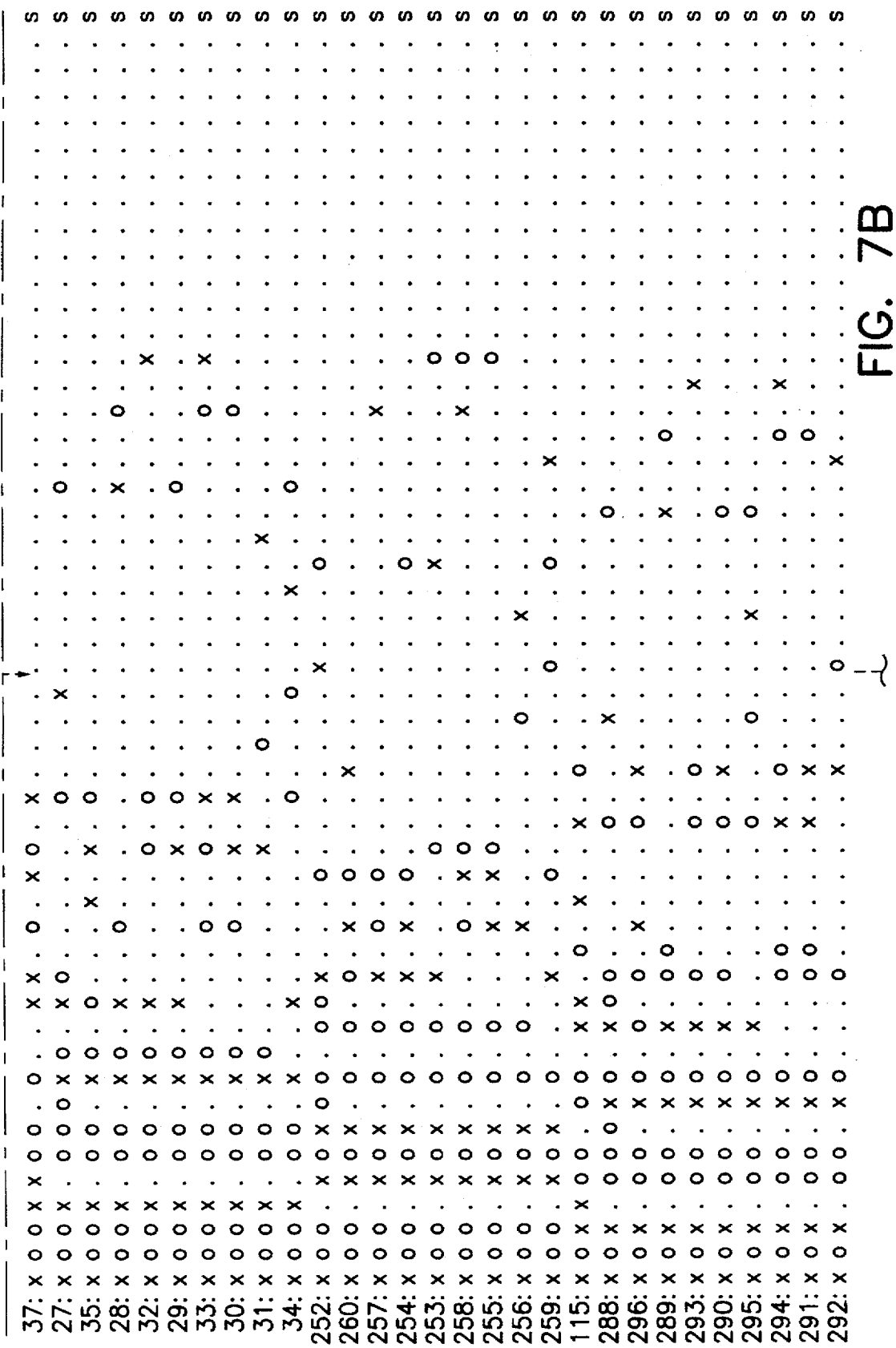

A partial result of the template sort is shown in FIG. 7 wherein the number at the beginning of each line is the template number; a capital letter means the pixel should be checked; a small letter o or x means that a comparison has been made in a previous template and can be skipped; the letter "O" means a white pixel; and the letter "X" means a black pixel. If the comparison action reaches the letter "S", a template has been successfully matched and the search procedure can stop. All "don't cares" (evidenced by dots) are skipped. FIG. 7 illustrates a portion of the beginning of the sort of templates which begin with a white pixel and a portion of the templates which begin with a black pixel.

Figure 8:
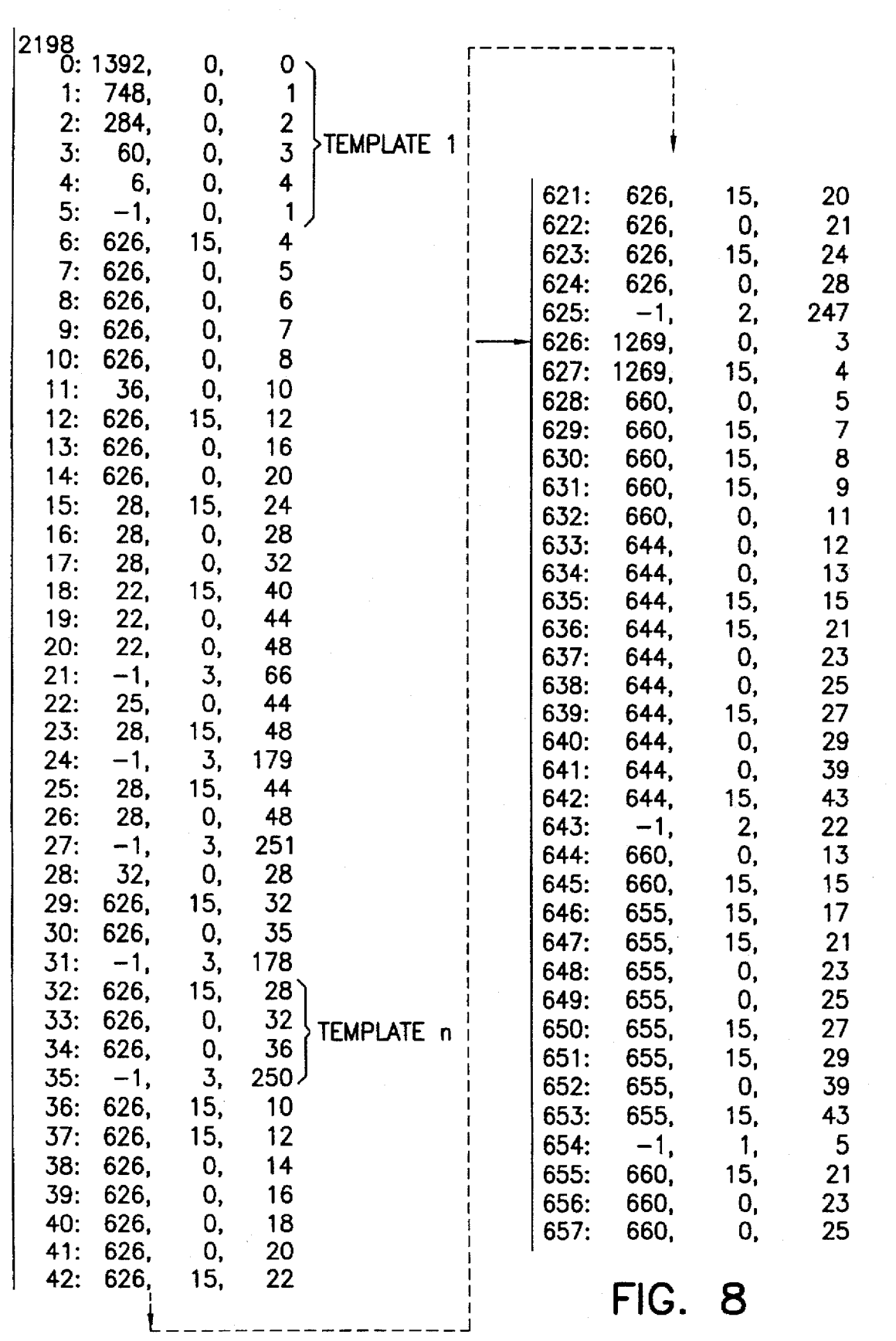

Once the sort of templates shown in FIG. 7 is generated, a linked search list is derived. An exemplary section of that list is shown in FIG. 8. The linked search list includes many entries (e.g., thousands), each of which indicates a pixel comparison to be performed. The linked search list essentially comprises many strings of linked templates. If an indicated template pixel entry finds a no-match condition with a logically corresponding image pixel, the linked search list entry indicates which next entry in the string is to be tried. So long as matches are found, a string of linked templates in the linked search list is traversed serially until a full template is matched (at which point the relevant indication is a −1, indicating that the search is over) and that the code value associated with the matching template can be output.

In FIG. 8, the first field in each entry of the linked search list contains the entry value to go to if the current comparison fails. For example, if a central pixel is not white, the first entry in the linked search list indicates that entry 1392 is next. The second field in each entry indicates whether the template pixel is white (0) or black (15). In the case of a template match, the second number is a code value from 0 to 5, indicating the pulse-width level for that pixel, as described above. If the value in the first entry column is a (−1), then a template has been successfully matched and the search can exit from the linked search list, The third field in each entry contains the address of the template pixel which is being compared, in this case a number from 0 to 48. In the case of a template match, the third number indicates which template is matched. This value is not used, but provides valuable statistical information for later analysis.

As above indicated, when the linked search list of FIG. 8 is constructed, all don't cares are excluded so as to reduce its size. Further, each template in a string in the linked list includes only template entries for which a match has not been found in a previous compare action in the string. Thus, there are only two templates which include central template pixel values, i.e., one with a black central pixel value and one with a white central pixel value. In addition, when a link entry causes a traversal of a string to a further template, that template includes only template pixel values starting from the linked pixel value and proceeding further outward in the generally spiral manner described above.

The linked search list enables the search to be rapidly accomplished and, in general, only an average of 5–10 entries are accessed. As an example, assume that a succession of n pixels from a template are found to match with corresponding pixels from an image pixel window. Under such a condition, the procedure moves down the linked search list, from entry to entry in a serial manner. However, if the comparison action for an n+1st pixel finds a no-match condition, the procedure examines the value in the first field of the entry to find an address (i.e., an entry in the linked search list) in another template where a match will be found for the n+1 st pixel—it already being known that the "another" template will have identical first n pixel values which, as stated above, are not included in the entries of the "another" template .

The method proceeds through the linked search list until a (−1) value is found in the first field of an entry, indicating a successful template match and further providing the code value to be used to modulate the pulse width of the laser. In the event no matching template is found, the procedure accepts the existing image pixel value, i.e., either black or white.

Figure 9:
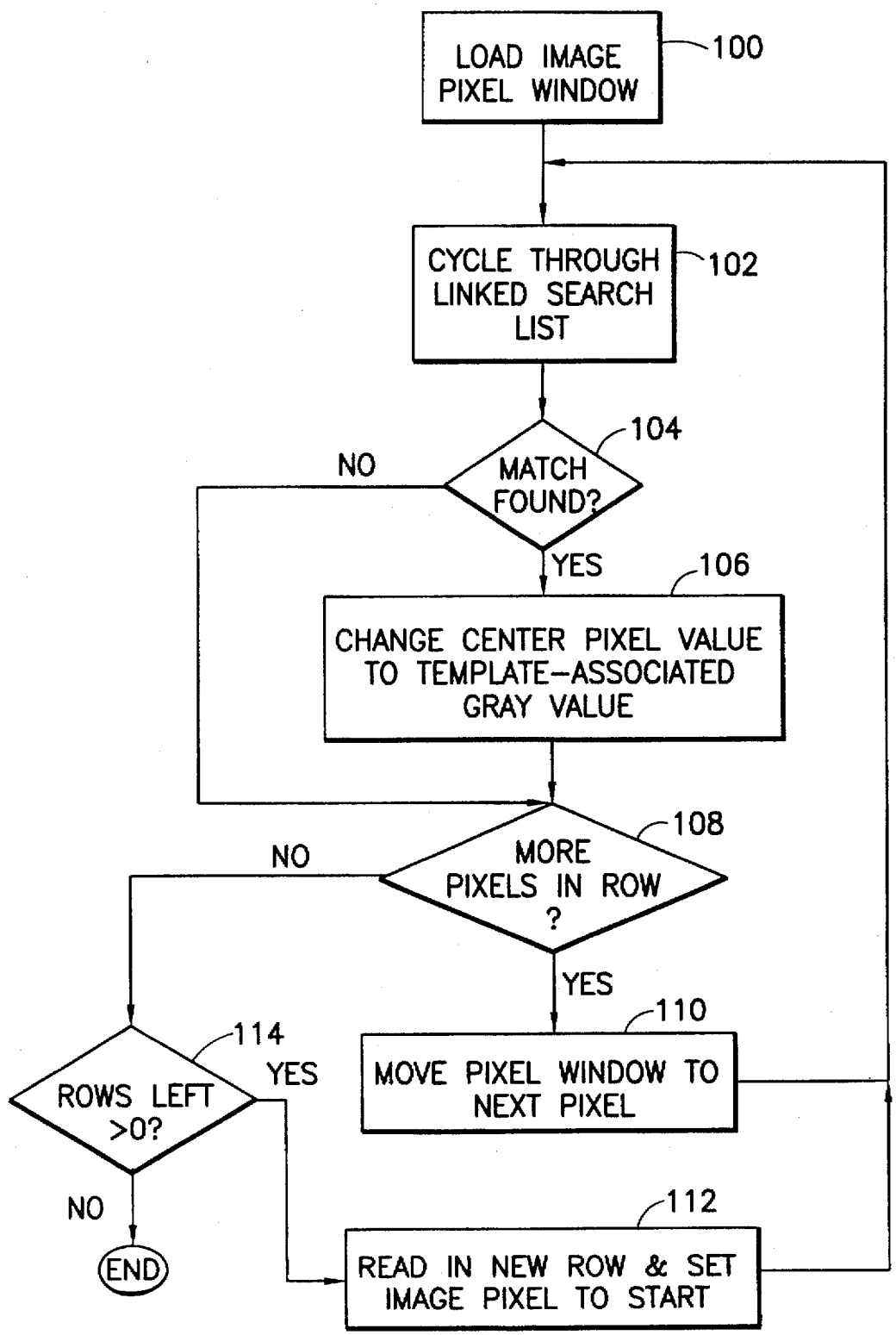
FIG. 9 is a flow diagram illustrating the overall operation of the invention.

FIG. 9 is a logical flow diagram that describes the overall method of the invention. As above-indicated, the procedure is applied to received bitmapped font data which, after processing is stored to be later used when called upon to produce documents. When an initial bitmap is accessed, an image window of, for example, 9×9 pixels is loaded with image pixels (box 100), starting at the top of the image. Then (referring to FIG. 6b), the central pixel of the image window is compared with the first entry in the linked search list (which is the central pixel in "white area" template illustrated in FIG. 6b)(box 102). If the template pixel matches the central image pixel, the procedure moves to the next entry in the linked search list. If the comparison fails, then the procedure moves to the linked search list entry that is indicated in the first field of the entry where the match failed. This procedure continues until a (−1) is encountered in the first field (indicating that a template match has been found) (decision box 104). At that point, the code value associated with the matching template is output so as to enable substitution of an appropriate gray level value for the central image pixel (box 106).

If no match is found, the procedure skips box 106 and moves directly to consideration of remaining pixels in the row (decision box 108). If there is another image pixel in the row, the procedure moves the image pixel window to the next row (box 110) and the process is repeated until all pixels in the image have been compared. At such point, if there are no further rows of the image left (decision box 114), the procedure is at an end. If one or more rows are left, a new row is read in, the image pixel window is reset to the beginning of the row (box 112), and the procedure recycles.

Table 2 below indicates statistics which have been accumulated when the above-noted procedure is run on a typical test page which has a high percentage of white area.

TABLE 2

|  | N | Template Entry Comparisons (C) | C/N |
|---|---|---|---|
| Dots matching template 1 (white area) | 75529591 | 37764795 | 5.0 |
| Dots matching template 2 (black area) | 73503 | 661527 | 9.0 |
| Dots matching a RET template | 36042 | 932720 | 25.9 |
| Dots failing to match a RET template | 177496 | 4469723 | 25.2 |
| TOTAL dots = 2450 × 3200 | 7840000 | 43828765 | 5.6 |

The above statistics indicate that it takes 5 comparisons to find a white area pixel and 9 comparisons to find a black area pixel. For pixels actually considered for modification, an average of only 25 comparisons are made to find a 2 templates on average are checked to find a match or failure. The average number of comparisons for the entire image plane is only 5.6.

Of course, a bitmapped font cell has much less white space than an entire text image plane. In such case, statistical analysis indicates that an average of about 10 comparisons per pixel are required before it is determined whether or not a match exists. Further, once a bitmapped font character has been smoothed by this procedure, it is cached, and can be placed anywhere on the page without re-running the procedure.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for determining multi-bit gray values to be assigned to pixels comprising an image of binary pixel values, said method comprising the steps of:
   a) providing a linked list of templates, each template associated with a multi-bit gray level value and comprising a listing of entries which includes a central pixel value and plural neighbor pixel values, said entries ordered in a sequence starting with said central pixel value followed by neighbor pixel values that are logically arranged concentrically about said central pixel, each entry configured with a field for a template pixel value and a linking field for a next entry if said template pixel value does not match a logically corresponding image pixel value, said linked list comprising plural, linked strings of templates, an initial template in a string including a central template pixel value and subsequent templates in said string including only neighbor template pixel values that are not matched by template entries in a template or templates positioned earlier in said string;
   b) selecting a window of image pixels;
   c) comparing a central image pixel value from said window with said central pixel value of a first template of a string and, if a match results;
   d) comparing an image pixel value that is next logically located in a generally spiral direction from a last compared image binary pixel value, to a logically correspondingly positioned template pixel value and, if a match results;
   e) repeating step d) until an end of a template listing is encountered, and indicating a matching template by issuing an associated multi-bit gray level value to substitute for said central image pixel; or
   f) if step c) or d) results in a non-match between a template entry and an image pixel value, moving to a template entry in a string that is indicated by a value in the linking field of the template entry for which said non-match occurred, and repeating steps d) and e); or
   g) if a template entry is a last entry in a string in said linked list, assigning a multi-bit gray level value that is equal to the central image pixel value for which no matching template is found.

2. The method as recited in claim 1, wherein each listing of entries comprising a template includes only entries for logical pixel locations which, if present in logically corresponding image pixel locations in said window, result in a substitution by said associated multi-bit gray value.

3. The method as recited in claim 1, wherein said first template comprises plural entries which, including an entry corresponding to said central pixel value, indicate all white binary pixel values.

4. The method as recited in claim 3, wherein said linked list arranges an initial group of said templates in an order based upon a number of white pixels in a string, starting from said central pixel value.

5. The method as recited in claim 4, wherein said linked list arranges a further group of said templates in an order based upon a number of black pixels in a string.

6. The method as recited in claim 1, wherein said image of binary pixel values consists of a bitmapped font character.

7. The method as recited in claim 6, comprising the further steps of:
   h) storing multi-bit gray values corresponding to pixels of said bitmapped font character for later inclusion in an image plane of a media sheet; and i) repeating the method for all characters in said font.